(12) United States Patent
Jäderberg et al.

(10) Patent No.: US 12,403,518 B2
(45) Date of Patent: Sep. 2, 2025

(54) METHOD AND ARRANGEMENT FOR PRODUCING A HARDENED SHEET METAL PRODUCT

(71) Applicant: TCTECH SWEDEN AB, Spånga (SE)

(72) Inventors: Jan Jäderberg, Spånga (SE); Jörgen Brandt, Åhus (SE)

(73) Assignee: TC TECH SWEDEN AB (SE)

( * ) Notice: Subject to any disclaimer, the term of this patent is extended or adjusted under 35 U.S.C. 154(b) by 0 days.

(21) Appl. No.: 18/606,020

(22) Filed: Mar. 15, 2024

(65) Prior Publication Data

US 2024/0261842 A1 Aug. 8, 2024

Related U.S. Application Data

(63) Continuation of application No. 16/476,933, filed as application No. PCT/SE2018/050001 on Jan. 2, 2018, now abandoned.

(30) Foreign Application Priority Data

Jan. 11, 2017 (SE) .................................. 1750017-4

(51) Int. Cl.
*B21D 22/02* (2006.01)
*C21D 1/42* (2006.01)
(Continued)

(52) U.S. Cl.
CPC ............. *B21D 22/022* (2013.01); *C21D 1/42* (2013.01); *C21D 1/673* (2013.01); *H05B 6/365* (2013.01); *H05B 6/40* (2013.01); *C21D 2221/10* (2013.01)

(58) Field of Classification Search
CPC ........ B21D 22/022; C21D 1/42; C21D 1/673; H05B 6/365; H05B 6/40
(Continued)

(56) References Cited

U.S. PATENT DOCUMENTS 4,321,097 A    3/1982  Kerr
7,981,350 B2 *  7/2011  Jaderberg ................ B29C 33/04
                                            425/174.8 E (Continued)

FOREIGN PATENT DOCUMENTS

AU        2137199 A      10/1999
CN      102921727 A       2/2013
(Continued)

OTHER PUBLICATIONS

Machine Translation of DE102012021031 (Year: 2024).*

*Primary Examiner* — Steven W Crabb
*Assistant Examiner* — Thomas J Ward
(74) *Attorney, Agent, or Firm* — Condo Roccia Koptiw LLP

(57) ABSTRACT

The present disclosure relates to a method and a corresponding arrangement for producing a hardened sheet metal product. The method includes placing a sheet metal piece in a heating station and heating selected areas of the sheet metal piece in the heating station by means of induction. In this process, a coil induces currents that flow in a front metal layer on a front side of the coil. Opposing ends of the front metal layer are interconnected by a low resistance short-circuiting arrangement running on a rear side of the coil. The short-circuiting arrangement comprises a material with lower resistivity than the front metal layer. The heated piece is moved to a pressing station, where it is pressed while the heated areas are cooled.

11 Claims, 2 Drawing Sheets

(51) Int. Cl.
    *C21D 1/673* (2006.01)
    *H05B 6/36* (2006.01)
    *H05B 6/40* (2006.01)

(58) Field of Classification Search
    USPC .................................................. 219/645
    See application file for complete search history.

(56) References Cited

U.S. PATENT DOCUMENTS

| | | |
|---|---|---|
| 9,482,304 B2 | 11/2016 | Battlogg et al. |
| 2010/0326984 A1 | 12/2010 | Mochinaga et al. |
| 2013/0312478 A1 | 11/2013 | Kobayashi |
| 2013/0333190 A1 | 12/2013 | Mizumura et al. |
| 2014/0124104 A1* | 5/2014 | Trippe .................... C22C 38/44 72/342.7 |
| 2015/0053670 A1 | 2/2015 | Horn et al. |
| 2015/0107325 A1 | 4/2015 | Glueck et al. |
| 2015/0321388 A1 | 11/2015 | Jderberg et al. |
| 2016/0108489 A1 | 4/2016 | Sikora et al. |

FOREIGN PATENT DOCUMENTS

| | | | |
|---|---|---|---|
| CN | 103447366 A | 12/2013 | |
| DE | 102012021031 A1 * | 5/2013 | ............ C21D 1/673 |
| EP | 2955239 A1 | 12/2015 | |
| EP | 2960035 A1 | 12/2015 | |
| JP | S5311110 A | 2/1978 | |
| JP | 2006212690 A | 8/2006 | |
| JP | 2006212705 A | 8/2006 | |
| JP | 2006348374 A | 12/2006 | |
| JP | 2009022995 A | 2/2009 | |
| JP | 2013244510 A | 12/2013 | |
| JP | 2015039719 A | 3/2015 | |
| JP | 2016153237 A | 8/2016 | |
| JP | 2016524043 A | 8/2016 | |
| WO | 2012118223 A1 | 9/2012 | |
| WO | 2013002703 A1 | 1/2013 | |
| WO | 2014000900 A1 | 1/2014 | |
| WO | 2014009000 A1 | 1/2014 | |
| WO | 2014104963 A1 | 7/2014 | |
| WO | 2015197415 A3 | 3/2016 | |

* cited by examiner

METHOD AND ARRANGEMENT FOR PRODUCING A HARDENED SHEET METAL PRODUCT

CROSS REFERENCE TO RELATED APPLICATIONS

This application is a continuation of U.S. application Ser. No. 16/476,933, filed Jul. 10, 2019, which is a National Stage Entry under 35 U.S.C. § 371 of Patent Cooperation Treaty Application No. PCT/SE2018/050001, filed 2 Jan. 2018, which claims priority from Swedish Application No. 1750017-4, filed 11 Jan. 2017, the contents of each of which are hereby incorporated by reference herein in their entireties.

FIELD OF THE INVENTION

The present disclosure relates to a method for producing a hardened sheet metal product. The disclosure further relates to an arrangement and devices configured to carry out the method.

TECHNICAL BACKGROUND

Hardening of sheet metal products is carried out to alter metallurgic properties of a piece of sheet metal. Traditionally, hardening has been done by heating a piece of metal in a forge and for instance cooling it quickly using water. It has recently been suggested to partially heat a piece of sheet metal using a high-power laser. One problem with such processes is that they are rather slow, as the laser beam has to sweep the entire trace that need be heated. Of course, this could be remedied to some extent by using multiple lasers, but to a much higher cost. Three to five paragraphs should do it, but this is not a hard and fast rule. May depend on the number of independent claims.

SUMMARY OF THE INVENTION

One object of the present disclosure is therefore to provide a hardening method which is more efficient. This object is achieved by means of a method as defined in claim 1. More specifically, there is provided a method for producing a hardened sheet metal product comprising placing a sheet metal piece in a heating station, and heating selected areas of the sheet metal piece in the heating station by means of induction. In the heating station, a coil induces currents that flow in a front metal layer on a front side of the coil and first and second opposing ends of the front metal layer are inter-connected by a short-circuiting arrangement running on a rear side of the coil, the short-circuiting arrangement comprising a material with lower resistivity than the front metal layer. The heated sheet metal piece is moved to a pressing station, and the sheet metal piece is pressed while cooling said heated areas.

With this method, all areas of the sheet metal piece that are to be heated can be heated simultaneously which provides for a much more efficient process. Further, the heated areas may be cooled more quickly and in a much more uniform manner, which provides improved hardening properties.

In one example, suitable e.g. for hardening steel, the front metal layer may comprise the sheet metal piece, i.e. the currents developing heat are induced in the piece to be processed itself.

In an alternative example, the front metal layer may comprise a heating layer located directly beneath the sheet metal piece, the sheet metal piece being separable from the heating layer. This is useful for treating sheet metal with very low resistivity, such as aluminum.

Inlays may be located directly beneath the front metal layer, which by conveying magnetic flows or electric currents partially reduce the development of heat in the front metal layer. This allows a pattern with any desired shape to be heated on the sheet metal piece.

A corresponding production arrangement and a corresponding heating station may also be considered.

DETAILED DESCRIPTION

Figure 1:
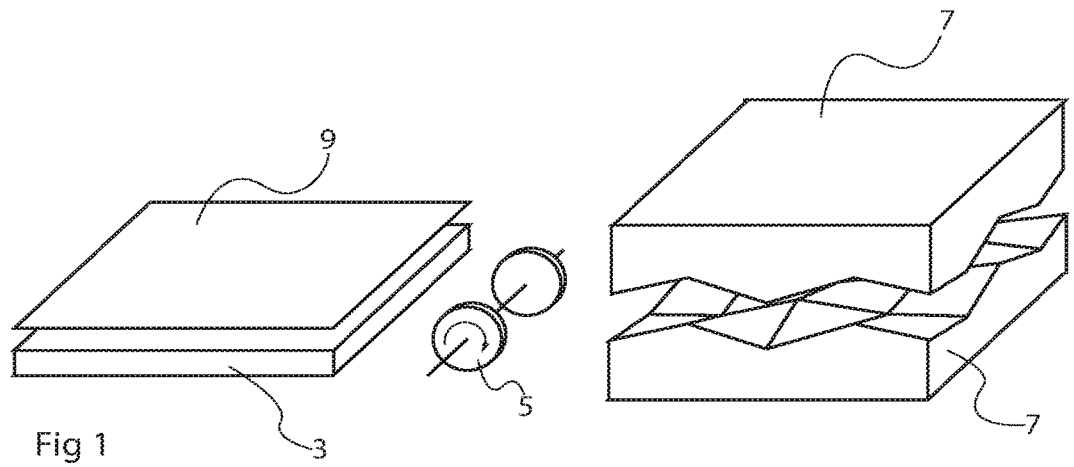
FIG. 1 illustrates schematically an arrangement for processing a sheet metal material according to the present disclosure.

FIG. 1 illustrates schematically an arrangement 1 for processing a sheet metal material according to the present disclosure. The arrangement 1 includes a heating station 3 and a pressing station 7 or press as well as a transport device 5, devised to rapidly transport a heated piece of sheet metal from the heating station 3 to the pressing station 7. This may be done such that pressing can take place within five seconds from ending heating.

The arrangement 1 realizes a method for producing a hardened sheet metal product that includes the following steps. First, a piece of sheet metal 9 is placed in the heating station 3 as shown in FIG. 1. This may be done manually or automatically by means of an additional transport device (not shown). As illustrated, the piece of sheet metal 9 may be flat, although this is not necessary.

Figure 2:
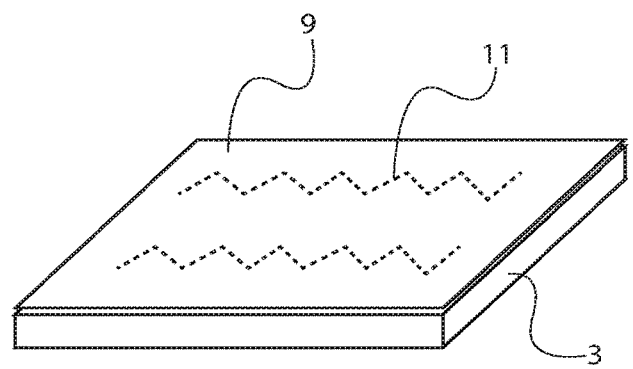
FIG. 2 illustrates the operating of a heating station of FIG. 1.

The heating station 3 heats the sheet metal piece, either the whole surface thereof or as illustrated in FIG. 2, a pattern 11 on that surface. The amount of heating needed depends on the metallurgic properties of the material of the piece 9, and the desired outcome of the hardening process. For instance, if a steel is hardened and a trace with a different crystalline structure is desired along the pattern 11, the material in the pattern could be heated to a temperature e.g above 910° C. and then relatively quickly cooled.

Figure 3:
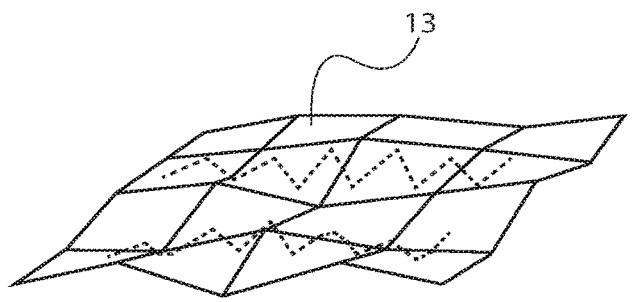
FIG. 3 shows a processed piece of sheet metal.

With reference again to FIG. 1, once the heating has taken place, in a manner de-scribed later, the piece 9 is quickly moved to the press or pressing station 7, where the piece is pressed into a shape deviating from the previous shape, and optionally punched to provide cut-outs in the piece, as desired. Not only does this process reshape the piece 9, but also cools the previously heated parts of the piece to provide a hardening effect, if needed. The result is a piece as shown in FIG. 3. The hardened pattern 11 may help to provide the finished piece 13 with desired properties, for instance it may deform in a desired pattern thanks to a stiffer but more brittle material in the generated pattern 11. This may be useful for instance for automotive products where driver and passenger safety requires that a colliding car is deformed in a predetermined way.

Returning again to FIG. 1, the transport device 5 is symbolically illustrated as a roller. However, various devices can be used to transport the piece 9 from the heating station 3 to the pressing station 7, such as industrial robots, etc. In some hardening processes, it may be required that the time before the heating ends and the pressing takes place is short, typically under 5 seconds which sets a requirement for the transport device 5.

The heating station 3 in FIG. 1 is illustrated as open upwards. However, it is possible, similar to in the pressing station 7 as illustrated, to provide an upper half also in the heating station 3 that presses against the lower half.

Figure 4:
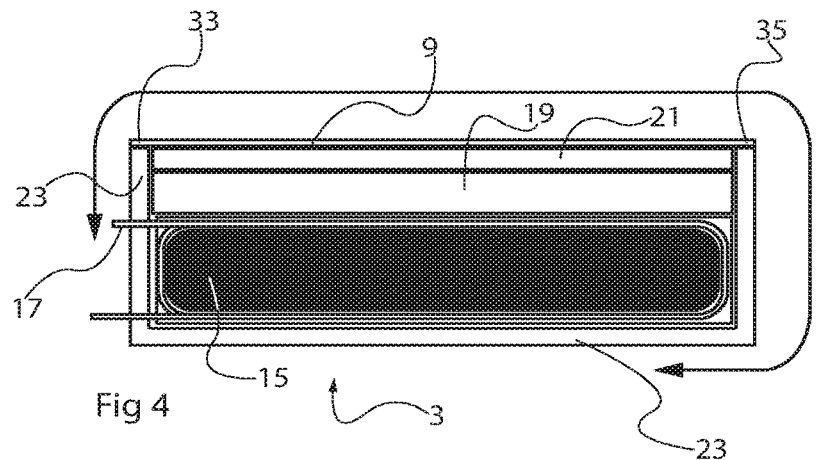
FIG. 4 illustrates schematically a stack of layers in a first example of a heating station.

The heating of the selected areas of the sheet metal piece 9 in the heating station 3 is carried out by means of induction as will now be described with reference to a first example illustrated in FIG. 4, showing a schematic cross section through a heating station 3.

Specifically, there is used a coil 17 which is fed by a high frequency (typically in the range 20-50 kHz) alternating current pulse. The coil is made from a low resistivity material, such as aluminum of copper, and is wound around a coil carrier 15.

The coil carrier 15 may comprise a material with high resistivity, and that has a high relative magnetic permeability. Soft magnetic composites, such as for instance SOMALOY, comprising ferromagnetic granules that are sintered to a desired shape with an insulating plastic material is one example of materials suitable for this purpose.

The coil 17 and the coil carrier 15 will induce strong electric currents that flow in conductive neighboring elements. A main current loop is formed by the sheet metal piece 9 and a short-circuit arrangement 23. The short-circuit arrangement 23 interconnects opposing edges 33, 35 of the sheet metal piece 9, which in this example forms a front metal layer. 'Front' here relates to the surface on a front side of the coil 17 and the surface of the heating station 3 where heating is intended to take place. Opposing edges 33, 35 of the front metal layer, where the coil turns, are interconnected by a short-circuiting arrangement 23 running on a rear side of the coil 17. Thus, strong alternating currents will run in the direction indicated by arrows in the drawing, while likewise alternating magnetic fields run perpendicular to the currents. The currents will develop heat in this loop. However, if the sheet metal piece 9 to be heated and making up the front metal layer is a steel that allows hardening, and the short-circuiting arrangement 23 is made of e.g. copper or aluminum, most of that heat will be developed in the higher resistivity sheet metal piece 9 that becomes heated in a very efficient way. Generally, the short-circuiting arrangement 23 may comprise a material with lower resistivity than the front metal layer.

An intermediate conductive layer 19 may be placed in between the coil carrier 15 and the front metal layer 9. This intermediate layer 19 may be electrically/galvanically insulated from neighboring layers but may itself be highly conductive, for instance made of copper or aluminum and may be up to a few centimeters thick. The coil 17 induces currents in the lower face of the intermediate layer 19, and those currents run, due to the skin effect, close to the surface of the layer 19, along the lower face, a first end face, the upper face and a second end face back to the lower face to form a closed loop close to the outer boundaries of the intermediate layer 19. Therefore, strong currents will be present in the top surface of the intermediate layer 19 that assist in driving currents through the front metal layer 9 by induction.

A thermally insulating layer 21 may be placed beneath, typically directly beneath the front metal layer 9. This layer serves to reduce the conduction of heat from the front metal layer 9 such that the latter can reach higher temperatures. Materials such as glass, ceramic compositions as for instance including yttrium stabilized zirconium, YSZ, or different plastic materials such as KAPTON, may be considered for this purpose.

Figure 5:
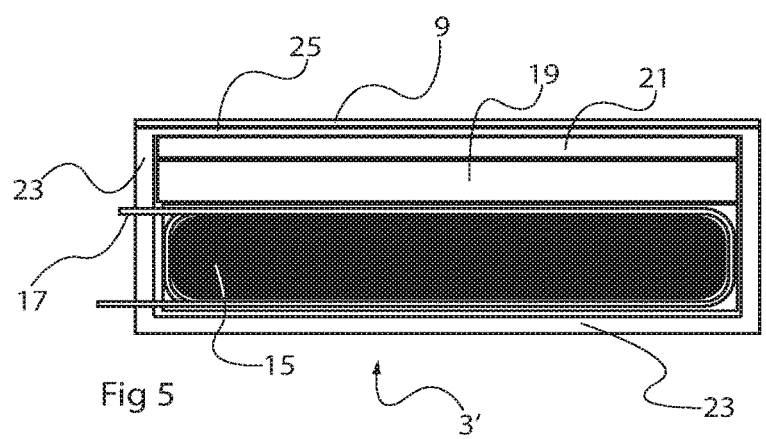
FIG. 5 illustrates schematically a stack of layers in a second example of a heating station.

FIG. 5 illustrates schematically a stack of layers in a second example of a heating station 3'. This stack is intended for the heating of sheet metal pieces 9 which them-selves have a very low resistivity, such as aluminum. In this example, a stationary front metal layer 25 is provided that is connected to the short-circuiting arrangement 23. That connection may be more or less permanent, and the stationary layer 25 may have similar properties as the sheet metal piece 9 making up the front metal layer in the example in FIG. 4, i.e. high a conductivity, but still lower than the one of the short-circuiting arrangement.

In this example, therefore, it is the stationary layer 25 that is heated, and this heat in turn is conveyed to the sheet metal piece 9 stacked on the stationary layer 25. Then, the sheet metal piece 9 is separated from the stationary layer and moved to the pressing station. This arrangement for instance allows hardening of aluminum. While the heating will not be as effective as in the previous example, temperature requirements may not be as high.

Figure 6:
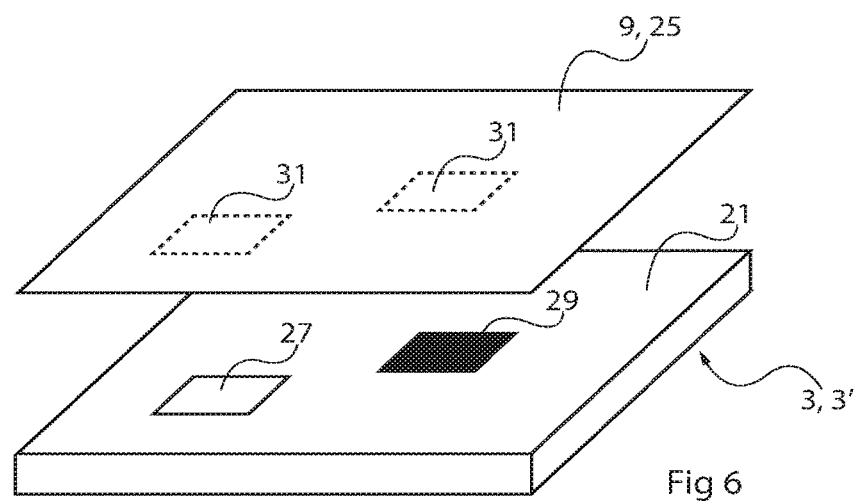
FIG. 6 illustrates varying heating over a sheet metal surface by means of inlays beneath the sheet metal piece.

FIG. 6 illustrates varying of the heating over a sheet metal piece's 9 surface. This may be accomplished by means of inlays that are located directly beneath the front metal layer, whether this is the sheet metal piece 9 itself as in FIG. 4 or a stationary metal layer as in FIG. 5. The inlays may therefore be located in milled recesses in the underlying, thermally insulating layer 21. The inlays may comprise electrically highly conductive pieces 27, such as copper or aluminum. Alternatively, highly magnetically conductive pieces 29 with high relative magnetic permeability such as used in the coil carrier can be considered. The electrically conductive pieces 27 will locally divert the electric current from the front metal layer. Similarly, the highly magnetic pieces will divert the magnetic field from the front metal layer. In either case areas 31 with reduced heat development will result in the sheet metal piece, which allows selective hardening of the piece 9. Additional cooling may optionally be provided, that cools areas not intended to be heated to some extent, e.g. by means of a fluid flow, for instance in the intermediate layer 19.

The present disclosure is not restricted to the described examples, and may be varied and altered in different ways within the scope of the appended claims. For instance, even if above the heating of a flat sheet metal piece is described, it could be curved or in principle have an arbitrary shape. It would also be possible to combine the heating station with the press, thereby eliminating the need of a transport device in between the heating and the pressing operations. Metal working may further be divided into a plurality of successive steps, and a heating station as disclosed above may be used also after an initial pressing operation.

The invention claimed is:

1. A method for producing a hardened sheet metal product, the method comprising:
   placing a sheet metal piece in a heating station;
   heating selected areas of the sheet metal piece in the heating station by means of induction;

wherein a coil induces currents that flow in a front metal layer on a front side of the coil, wherein first and second opposing ends of the front metal layer are interconnected by a short-circuiting arrangement running on a rear side of the coil, the short-circuiting arrangement comprising a material with lower resistivity than the front metal layer, wherein a thermally insulating layer is placed beneath the front metal layer, and wherein inlays are located in the thermally insulating layer beneath the front metal layer, locally diverting the electric current from the front metal layer which by conveying magnetic flows or electric currents reduce the development of heat in the front metal layer in a pattern thereon;

moving the heated sheet metal piece to a pressing station; and pressing the sheet metal piece while cooling said heated areas.

2. The method according to claim 1, wherein the front metal layer comprises the sheet metal piece.

3. The method according to claim 1, wherein the front metal layer comprises a stationary heating layer located directly beneath the sheet metal piece, the sheet metal piece being separable from the stationary heating layer.

4. The method according to claim 1, wherein said inlays comprise an electrically highly conductive material, thereby locally diverting the electric current from the front metal layer.

5. The method according to claim 1, wherein said inlays comprise a material with low relative magnetic reluctance, thereby locally diverting the magnetic field from the front metal layer.

6. An arrangement for producing a hardened sheet metal product, the arrangement comprising:
  a heating station configured to receive a sheet metal piece, the heating station being configured to heat selected areas of the sheet metal piece in the heating station by means of induction, and the heating station comprising
    a coil inducing alternating currents that flow in a front metal layer on a front side of the coil, wherein first and second opposing ends of the front metal layer are interconnected by a short-circuiting arrangement running on a rear side of the coil, the short-circuiting arrangement comprising a material with lower resistivity than the front metal layer,
    a thermally insulating layer placed beneath the front metal layer, and
    inlays located in the thermally insulating layer beneath the front metal layer, configured to locally divert the electric current from the front metal layer which by conveying magnetic flows or electric currents reduce the development of heat in the front metal layer in a pattern thereon;
  a pressing station configured to press the sheet metal piece while cooling the heated areas; and
  a transport device configured to move the heated sheet metal piece from the heating station to the pressing station.

7. The arrangement according to claim 6, wherein the front metal layer is made up by the sheet metal piece to be heated.

8. The arrangement according to claim 6, wherein the front metal layer comprises a stationary heating layer located directly beneath the sheet metal piece, the sheet metal piece being separable from the stationary heating layer.

9. The arrangement according to claim 6, wherein said inlays comprise an electrically highly conductive material configured to locally divert the electric current from the front metal layer.

10. The arrangement according to claim 6, wherein said inlays comprise a material with low relative magnetic reluctance, configured to locally diverting the magnetic field from the front metal layer.

11. A heating station for a sheet metal hardening arrangement, the heating station configured to receive a sheet metal piece and to heat selected areas of the sheet metal piece by means of induction, wherein the heating station comprises:
  a coil that induces alternating currents that flow in a front metal layer on a front side of the coil, wherein first and second opposing ends of the front metal layer are interconnected by a short-circuiting arrangement running on a rear side of the coil, the short-circuiting arrangement comprising a material with lower resistivity than the front metal layer;
  a thermally insulating layer placed beneath the front metal layer; and
  inlays located in the thermally insulating layer beneath the front metal layer, said inlays configured to locally divert the electric current from the front metal layer which by conveying magnetic flows or electric currents reduce the development of heat in the front metal layer in a pattern thereon.

* * * * *